United States Patent [19]
Yamaguchi et al.

[11] Patent Number: 5,144,855
[45] Date of Patent: Sep. 8, 1992

[54] TILTING TYPE STEERING APPARATUS

[75] Inventors: Mikio Yamaguchi; Sakae Matsumoto, both of Takasaki, Japan

[73] Assignee: NSK Ltd., Tokyo, Japan

[21] Appl. No.: 741,563

[22] Filed: Aug. 7, 1991

[30] Foreign Application Priority Data

Aug. 16, 1990 [JP] Japan ................ 2-85891[U]

[51] Int. Cl.$^5$ .............................................. B62D 1/18
[52] U.S. Cl. ......................................... 74/493; 74/540; 280/775
[58] Field of Search ............... 74/493, 533, 534, 540; 280/775

[56] References Cited

U.S. PATENT DOCUMENTS 4,594,909  6/1986  Yamaguchi .................. 74/493
4,938,093  7/1990  Matsumoto et al. ........... 74/493
5,005,862  4/1991  Yamaguchi .................. 280/775

Primary Examiner—Richard Lorence
Attorney, Agent, or Firm—Shapiro and Shapiro

[57] ABSTRACT

A tilting type steering apparatus is constructed so that the steering column is positioned relative to the supporting bracket by allowing a first teeth provided in the steering column to engage second teeth provided pivotally in the supporting bracket. The tilting type steering apparatus is also provided with a shaft which presses the engaging member to allow the first teeth to engage the second teeth. Further a distance between the center of pivoting and the shaft pressing point is made to be more than 1.5 times as long as a distance between the center of pivoting and the center of engagement of the engaged.

1 Claim, 4 Drawing Sheets

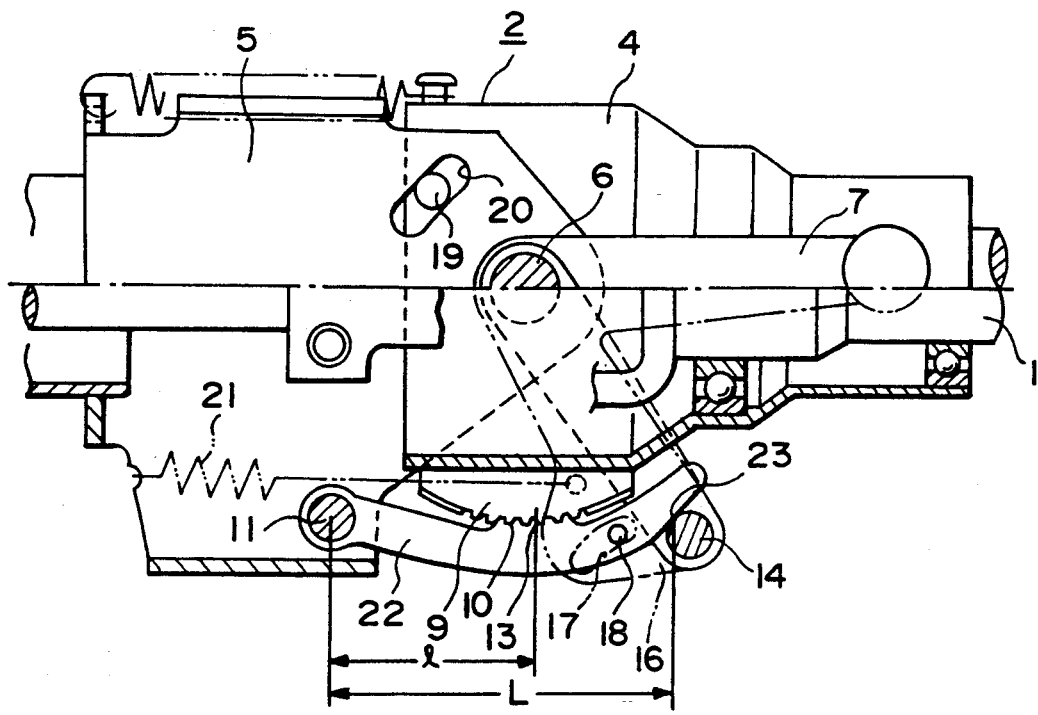
F I G. 1
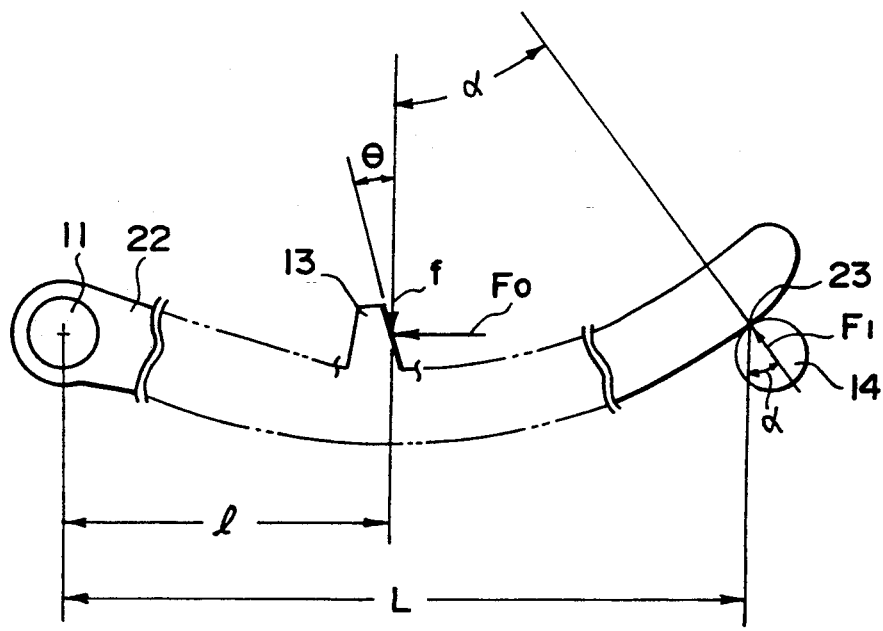
F I G. 2

TILTING TYPE STEERING APPARATUS

BACKGROUND OF THE INVENTION

1. Field of the Invention

This invention relates to a tilting type steering apparatus in which a steering column of an automotive steering apparatus is supported in such a manner as to be freely rockable relative to a vehicle body.

2. Related Background Art

An apparatus for adjusting the height of a steering wheel, called "tilting type steering apparatus" has been conventionally known in which the steering wheel has been constructed so that its height can be adapted to a driver's physical constitution, driving posture, etc.

As such a tilting type steering apparatus, one disclosed in U.S. Pat. No. 4,594,909 has been known so far.

The tilting type steering apparatus disclosed in this patent is called an "oscillating type". In this apparatus an articulated steering shaft 1 is allowed to pass through, as shown in FIG. 3, a steering column 2 formed in a cylindrical form and divided into two parts: a lower steering column 3 and an upper steering column 4, and both steering columns 3 and 4 are connected with each other a supporting bracket 5 portion mounted to the vehicle body. Also the upper steering column 4 is freely rockable around a first horizontal axis an pivots 6, 6 provided at the supporting bracket 5 as shown in FIGS. 4 to 6.

Between the supporting bracket 5 and the upper steering column 4, a locking mechanism is provided which can be freely engaged and disengaged by a tilt lever 7 for rocking around the first horizontal axis so that the upper steering column 4 may be connected with the supporting bracket 5 (rocking of the upper steering column 4 is made impossible), or be made to be freely displaceable relative to the supporting bracket 5 (rocking of the upper steering column 4 is made possible).

That is, at the under surface, etc. of a dash board 8, one end of the upper steering column 4 is pivotally supported at the supporting bracket 5 by pivots 6, 6 provided at the supporting bracket 5 fixed to the vehicle body. At the under surface of the upper steering column 4, a first engaging member 9 is fixed. At the under surface of the first engaging member 9, a circular convex surface is centered around the first horizontal axis, defined by pivots 6, 6, at the under surface of which first gear teeth 10 are formed.

A horizontal shaft 11 is mounted the supporting bracket 5, and one end (the left end in FIGS. 4 and 6) of a second engaging member 12 for engaging or disengaging the first engaging member 9 with rocking of the tilt lever 7 is supported by shaft 11 for pivotal movement about the shaft axis. At the top edge (top edge of the right end in FIG. 4) of the other end of this second engaging member 12, second gear teeth 13 are formed which can freely engage or disengage the first teeth 10 formed at the under surface of the first engaging member 9.

At a shaft 14 provided to span over between the lower ends of the tilt lever 7 a roller 15 is mounted to allow the top surface of the roller 15 to abut on the under surface of the second engaging member 12.

A pin 18 projecting from the side of the second engaging member 12 engages an inclined long hole 17 formed in a rocking plate 16 fixed to the tilt lever 7.

When the tilt lever 7 is rocked counterclockwise in FIG. 4, the roller 15 retreats from a position below the other end (the right end in FIG. 4) of the second engaging member 12, and at the same time, the other end of the second engaging member 12 displaces downward due to the engagement between the inclined long hole 17 and the pin 18 because of the above-mentioned construction.

As a result, the engagement is released between the second teeth 13 formed at the top edge of the other end of the second engaging member 12 and the first teeth 10 formed at the under surface of the first engaging member 9 fixed at the under surface of the upper steering column 4. Thus the upper steering column 4 can freely rock around the first horizontal axis at pivots 6, 6 (within a range in which a pin 19 projecting from the side of the upper steering column 4 can move inside a long hole 20 formed in the supporting bracket 5), enabling the free adjustment of the height of the steering wheel fixed to the one end of the steering shaft 1 passing through the inside of the upper steering column 4.

When the tilt lever 7 is rocked clockwise in FIG. 4 after thus adjusting the height of the steering wheel, the roller 15 enters below the other end of the second engaging member 12, and presses upward the other end of the second engaging member 12 to cause the second teeth 13 the second teeth 13 engage the newly confronting first teeth 10 (i.e., the teeth 10 which confront the second teeth 13 at the adjusted position of the upper steering column 4). This prevents the upper steering column 4 from rotating around the first horizontal axis at 6, 6.

As a result, the steering wheel is maintained at the adjusted height. Since the tilt lever 7 is given an elastic force to rock clockwise in FIG. 4 by a tensile spring 21 in this state, the roller 15 does not inadvertently retreat from below the second engaging member 12.

In the case of the foregoing construction, the first engaging member 9 is fixed to the under surface of the upper steering column 4, and the second engaging member 12 is pivotally supported on the supporting bracket 5. However, it is also possible to fix the first engaging member 9 to the under surface of the supporting bracket 5 and pivotally support the second engaging member 12 on the upper steering column 4 as shown in FIG. 7.

In the case of such conventional tilting type steering apparatus as constructed and used as mentioned above, when a strong force in the vertical direction is applied to the steering column 4, the roller 15 mounted to the shaft 14 displaces to the right in FIG. 4 or to the left in FIG. 7 against an elastic force of the tensile spring 21 to release the engagement between the first and the second gear teeth 10 and 13, causing the steering column 4 to displace.

That is, when a strong force in the vertical direction is applied to the steering column 4, the second engaging member 12 is pressed clockwise in FIG. 4 or counterclockwise in FIG. 7 as a reaction of a pressing force exerting on the engaged surface between the first and the second engaging teeth 10 and 13, and the tilt lever 7 displaces counterclockwise in FIG. 4 or clockwise in FIG. 7 by the engagement between the under surface of the second engaging member 12 and the roller 15. As a result, the engagement between the first and the second engaging teeth 10 and 13 is released as mentioned above, causing the steering column 4 to displace.

To prevent the displacement of the steering column 4, it is conceivable to strengthen the elastic force of the tensile spring 21. In this case, a force required to pivot the tilt lever 7 will be great when adjusting the height of the steering wheel so as to impair the operability. Accordingly this is not desirable.

SUMMARY OF THE INVENTION

It is an object of the present invention to provide a tilting type steering apparatus capable of preventing such displacement of the steering column without impairing the operability of the tilt lever.

A tilting type steering apparatus according to the present invention comprises, like the above-mentioned conventional tilting type steering apparatus, a supporting bracket fixed to a vehicle body, a steering column, one end of which is pivotally supported on a first horizontal axis at the supporting bracket, a first engaging member which comprises first gear teeth formed along a circular arc centered around the first horizontal axis and which is fixed to one of the steering column and the supporting bracket, a second engaging member having one end which is pivotally supported on a second horizontal axis by a shaft mounted to the other of the steering column and the supporting bracket, and having second gear teeth formed toward its other end for freely engaging or disengaging the first gear teeth, and a pressing member which abuts on the second engaging member at an abutment point with the rocking of a tilt lever to engage the second teeth with confronting ones of the first teeth.

Further in the tilting type steering apparatus according to the present invention, a distance between the second horizontal axis and the abutment point is made to be more than 1.5 times as long as a distance between the center of engagement of the collective engaged first and second teeth and the second horizontal axis.

When adjusting the height of the steering wheel in a tilting type steering apparatus according to the present invention as constructed as mentioned above, the operation itself is the same as in the case of the above-mentioned conventional tilting type steering apparatus.

However, in the case of a tilting type steering apparatus according to the present invention, since a distance between the second horizontal axis and the abutment point has been made to be more than 1.5 times as long as a distance between the center of engagement of the engaged gear teeth and the second horizontal axis, the engagement between the first and the second engaging members will be difficult to be released even if a great force in the vertical direction is applied to the steering column.

BRIEF DESCRIPTION OF THE DRAWINGS

FIGS. 1 and 2 show an embodiment according to the present invention, and FIG. 1 is a principal portion longitudinal side view;

FIG. 2 is a view showing a state of a force exerting in a direction of releasing the engagement between the gear teeth due to a force exerting on the steering column in the vertical direction;

FIG. 4 is an enlarged, partly sectional side view of the portion A in FIG. 3;

FIG. 5 is a sectional view taken on line 5—5 in FIG. 4;

FIG. 6 is a sectional view in the direction of arrow C of FIG. 4; and

DESCRIPTION OF THE PREFERRED EMBODIMENTS

Figure 3:
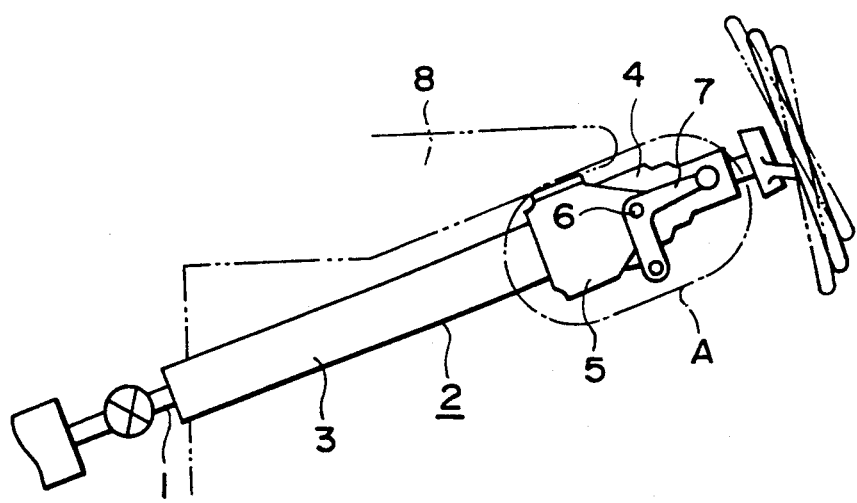
FIGS. 3 to 6 show a conventional tilting type steering apparatus, FIG. 3 being a side view showing the overall construction.

The present invention will hereinafter be described in detail with respect to FIGS. 1 and 2.

One end of an upper steering column 4 is supported on a supporting bracket 5 for pivotal movement about a first horizontal axis by a pair of (right and left) first horizontal pivots 6 (only one shown in FIG. 1) provided at the supporting bracket 5, which is fixed to a vehicle body.

A first engaging member 9 is fixed to the under surface of the upper steering column 4. At the under surface of the first engaging member 9, a circular convex surface centered about the first horizontal axis (of pivots 6) is formed, and first gear teeth 10 are formed on the circular convex surface.

A horizontal shaft 11 is provided below in front (below at left in FIG. 1) of the first horizontal axis at a portion of the supporting bracket 5, and one end of a second engaging member 22 is supported on the horizontal shaft 11 for pivotal movement about the shaft axis (second horizontal axis). At the top edge in the intermediate portion of the second engaging member 22, second gear teeth 13 are formed so that these can freely engage and disengage the first gear teeth 10 formed at the under surface of the first engaging member 9.

Figure 4:
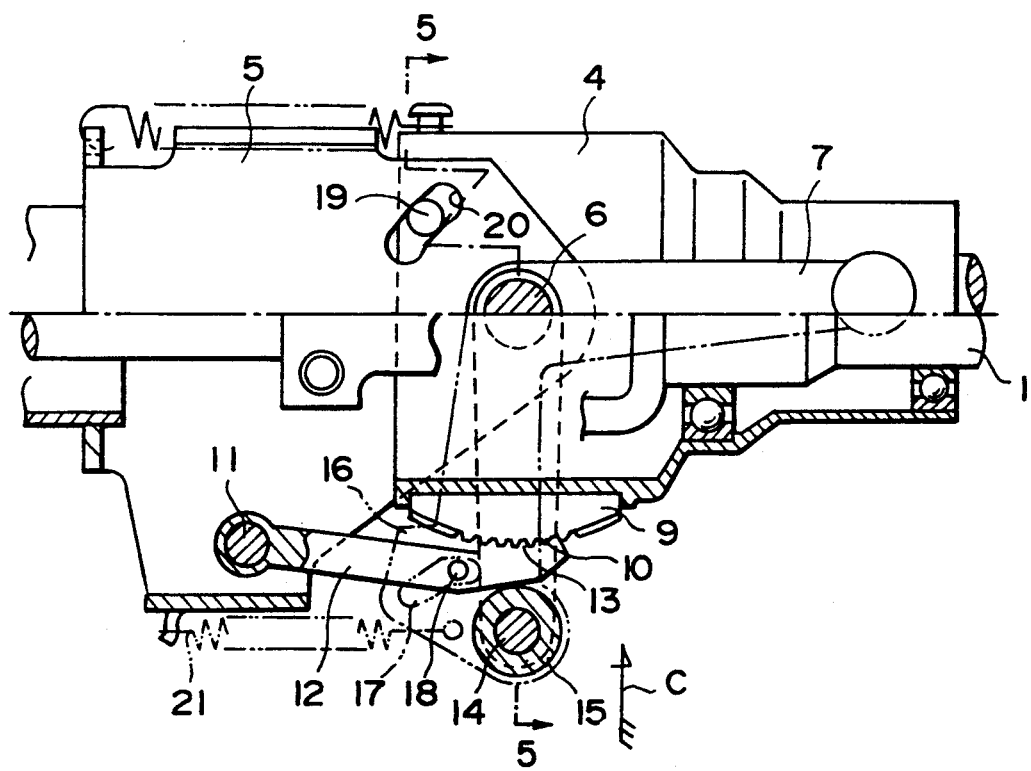
Figure 5:
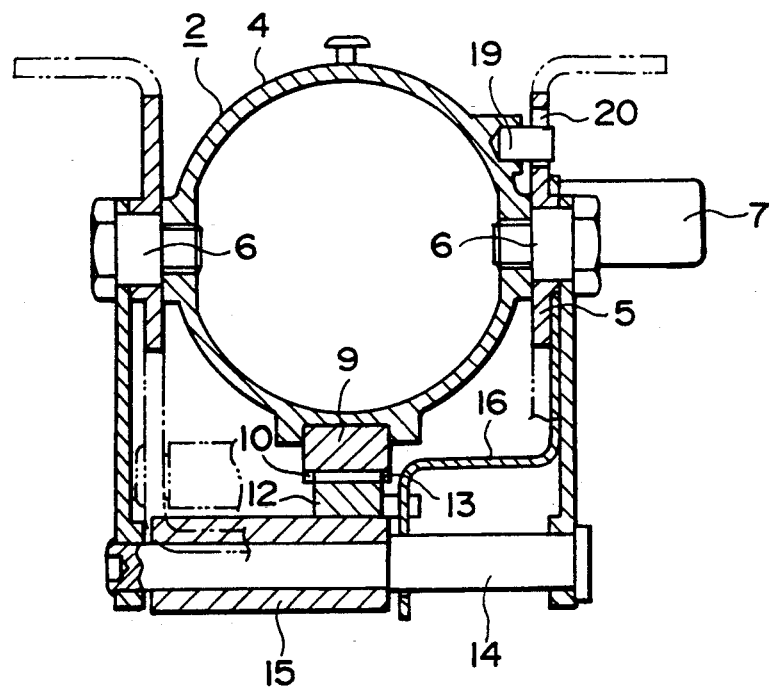
Figure 6:
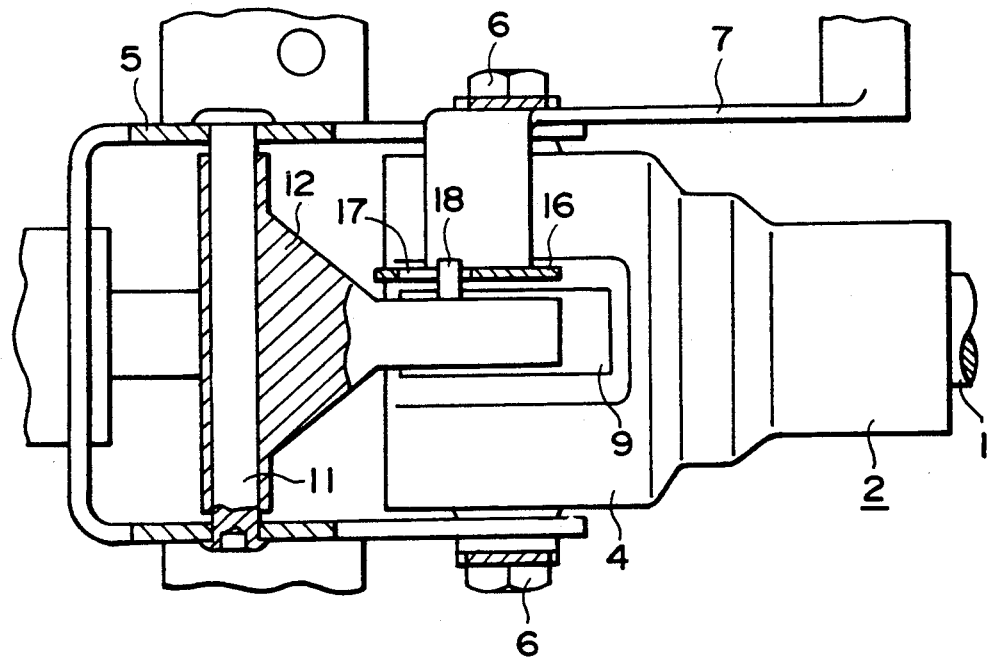
Figure 7:
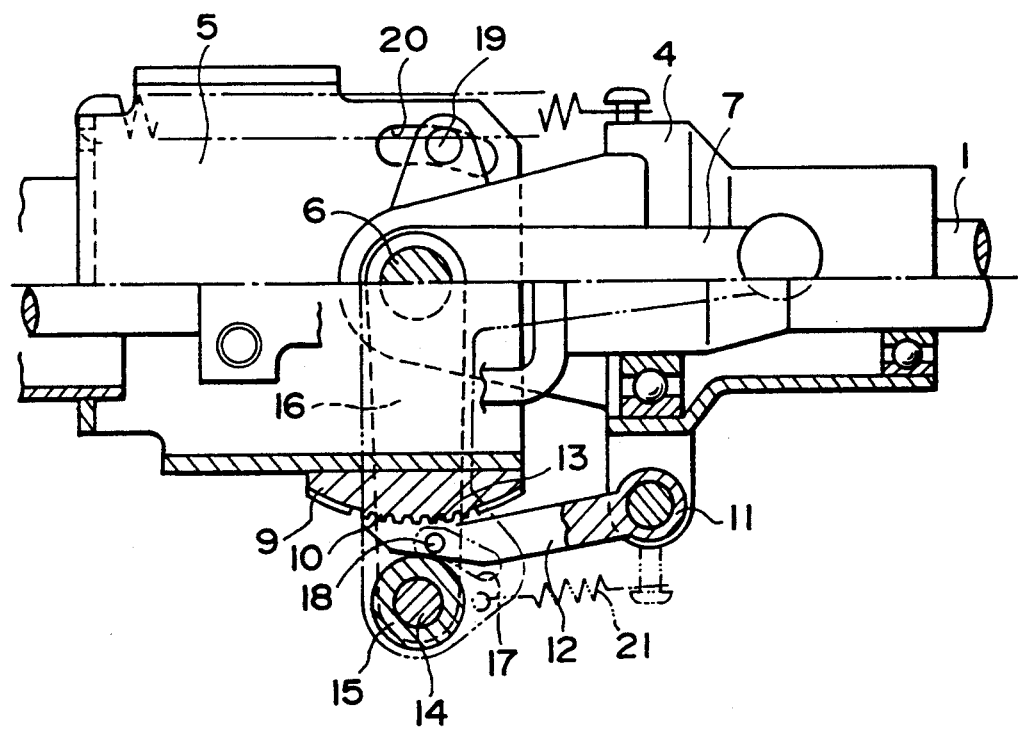
FIG. 7 is a partly sectional side view showing another conventional tilting type steering apparatus.

A shaft 14, which is a pressing member, is provided to span over between the lower ends of a tilt level 7, the intermediate portion of which is pivotally supported on the first horizontal axis by the pivots 6. The upper surface of the shaft 14 is allowed to abut on the under surface of the tip end of the second engaging member 22 directly or through a roller such as roller 15 as shown in FIGS. 4 and 7.

A point at which the upper surface of the shaft 14 abuts on the lower edge of the tip end of the second engaging member 22, becomes an abutment point 23, and rocking downward (clockwise in FIG. 1) of the second engaging member 22 is inhibited by abutment of shaft 14 with this abutment point 23. Further a pin 18 projecting from the side of the second engaging member 22 is disposed to engage an inclined long hole 17 formed in a portion fixed to the tilt lever 7.

In a tilting type steering apparatus according to the present invention, the second teeth 13, which can freely engage and disengage the first teeth 10, are formed at the top edge of the intermediate portion of the axis of engaging member 22. As a result, a distance L between the second horizontal shaft 11 and the abutment point 23 under the engagement between the first and the second teeth 10 and 13 is made to be more than 1.5 times and less than twice $(1.5l \leq L \leq 2.0l)$ as long as a distance $l$ between the center of engagement of the collective engaged teeth 10 and 13 and the axis of horizontal shaft 11.

An operation for adjusting the height of the steering wheel in accordance with a driver's physical constitution, etc. by the tilting type steering apparatus according to the present invention as constructed as mentioned above is the same as in the case of the above-mentioned conventional tilting type steering apparatus.

That is, to adjust the height of the steering wheel, rock the tilt lever 7 counterclockwise in FIG. 1 to retreat the shaft 14 from a position below the tip end of the second engaging member 22, and at the same time, to displace downward the second engaging member 22 due to the engagement between the inclined long hole 17 and the pin 18. By thus releasing the engagement between the second teeth 13 formed at the top edge of the intermediate portion of the second engaging member 22 and the first teeth 10 formed at the under surface of the first engaging member 9 fixed to the under surface of the upper steering column 4, it is possible to freely rock the upper steering column 4 around the first horizontal axis on pivots 6. This enables the free adjustment of the height of the steering wheel fixed to the end of the steering shaft 1 which passes through the inside of the upper steering column 4.

After adjusting the height of the steering wheel, rock the tilt lever 7 clockwise in FIG. 1 to press upward the second engaging member 22 by allowing the shaft 14 to enter below the tip end of the second engaging member 22. Thus, the second teeth 13 formed on the top edge of the intermediate portion of the second engaging member 22 are caused to engage the newly confronting first teeth 10 formed at the under surface of the first engaging member 9 in order to prevent the upper steering column 4 from rotating around the first horizontal axis.

As a result, the steering wheel is maintained at the adjusted height.

In the case of a tilting type steering apparatus according to the, present invention, since a distance L between the axis of horizontal shaft 11 and the abutment point 23 under the engagement between the first and the second teeth 10 and 13 has been made to be more than 1.5 times as long as a distance, l between the center of engagement of the engaged teeth 10 and 13 and the axis of horizontal shaft 11, the engagement between the first and the second teeth 10 and 13 will be difficult to be released even if a great force in the vertical direction is applied to the steering column 2.

For example, supposing that a gear pressure angle on the engagement surface between the first and the second teeth 10 and 13 is $\theta$ as shown in FIG. 2 and a force $F_0$ exerts on the first engaging member 9 fixed to the steering column 2, a force f represented by $f = F_0 \cdot \tan \theta$ exerts on the center of engagement of the gear teeth as a force in such a direction as to release the engagement between the first and the second gear teeth 10 and 13.

On the other hand, supposing that a force $F_1$ is applied to the second engaging member 22 by the shaft 14 to prevent the engagement between the first and the second teeth 10 and 13 from being released and an angle between a direction of a force exerting at the abutment point 23 and a direction of displacement of the second engaging member 22 is $\alpha$, we get $l \cdot f = L \cdot F_1 \cdot \cos \alpha$. That is, $F_1 = l \cdot f / L \cdot \cos \alpha$, and it can be seen that the longer the distance L between the axis of horizontal shaft 11 and the abutment point 23 is made than the distance l between the center of engagement of the collective engaged teeth 10 and 13 and the axis of horizontal shaft 11, and the smaller an angle $\alpha$ between the direction of the force exerting at the abutment point 23 and the direction of displacement of the second engaging member 22 is made (the more parallel the direction of the force exerting at the abutment point 23 is to the displacement direction of the second engaging member 22), the less a force $F_1$ to be applied to the second engaging member 22 by the shaft 14 becomes. Thus, it becomes more difficult to release the engagement between the first and the second gear teeth 10 and 13.

Supposing that, for example, l is 37.5 mm, L is 70 mm and $\alpha$ is 33 degrees, $F_1 \delta 0.64$ f, and a force to be applied to the shaft 14 decreases by 36%, and the disengagement of the first and the second teeth 10 and 13 becomes corresponding more difficult as compared with such a conventional construction as shown in FIG. 3.

On putting the present invention into practice, the second engaging member 22 may be pivotally supported on the upper steering column 4 with the first engaging member 9 fixed to the supporting bracket 5 side as shown in the above FIG. 7.

In the tilting type steering apparatus according to the present invention, displacement of the steering column can be prevented even if a strong force is applied to the steering column, while at the same time without impairing the operability by increasing the operating force of the tilt lever.

We claim:

1. A tilting type steering apparatus, comprising:
a supporting bracket fixed to a vehicle body;
a steering column, one end of which is supported on said supporting bracket for pivotal movement about a first horizontal axis;
a tilt lever mounted to said supporting bracket and rockable about said first horizontal axis;
a first engaging member having first gear teeth formed along a circular arc centered on said first horizontal axis, said first engaging member being fixed to one of said steering column and said supporting bracket;
a second engaging member having one end which is pivotally supported on a second horizontal axis by a shaft mounted to the other of said steering column and said supporting bracket, and having second gear teeth formed toward another end thereof for freely engaging with and disengaging from confronting first gear teeth of said first engaging member with the pivotal movement of said second engaging member; and
a pressing member mounted to said tilt lever and movable, with rocking of said tilt lever, into and out of abutment with an abutment point on said second engaging member to engage and disengage the confronting first and second gear teeth;
wherein a distance between said second horizontal axis and said abutment point is more than 1.5 times as long as a distance between said second horizontal axis and a center of engagement of the collective engaged first and second gear teeth.

* * * * *